United States Patent
Schumann

(10) Patent No.: US 6,283,886 B1
(45) Date of Patent: Sep. 4, 2001

(54) DRIVE FOR ADJUSTMENT DEVICES IN MOTOR VEHICLES

(75) Inventor: Peter Schumann, Untersiemau (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/442,678

(22) Filed: Nov. 18, 1999

(30) Foreign Application Priority Data

Nov. 20, 1998 (DE) .............................. 198 55 004

(51) Int. Cl.⁷ .............................. F16H 1/32; B60N 2/235
(52) U.S. Cl. .............................. 475/162; 192/15; 297/367
(58) Field of Search .................... 192/223.1, 15, 192/43.1; 74/143; 475/162, 175; 297/362, 367, 368

(56) References Cited

U.S. PATENT DOCUMENTS

| | | | |
|---|---|---|---|
| 2,746,331 | 5/1956 | Anderson | 81/58.1 |
| 2,995,226 | * 8/1961 | Gilder | 192/223.1 |
| 3,008,765 | * 11/1961 | Fischler | 297/367 |
| 5,611,747 | * 3/1997 | Bauer et al. | 475/162 |
| 5,692,589 | * 12/1997 | Beguin | 297/367 |
| 5,755,491 | 5/1998 | Baloche et al. | 297/362 |
| 5,794,479 | 8/1998 | Schwarzbich | 74/143 |
| 5,865,285 | 2/1999 | Minkenberg et al. | 192/15 |
| 5,881,854 | 3/1999 | Rougnon-Glasson | 192/15 |
| 5,918,714 | * 7/1999 | Kadereit | 192/15 |

FOREIGN PATENT DOCUMENTS

| | | | |
|---|---|---|---|
| 39 14 056 | 8/1990 | (DE) . | |
| 41 20 617 A1 | 12/1992 | (DE) . | |
| 44 37 073 | 1/1996 | (DE) . | |
| 195 27 912 | 8/1996 | (DE) | 192/15 |
| 195 18 424 | 11/1996 | (DE) | 74/143 |
| 195 40 631 | 5/1997 | (DE) . | |
| 197 02 123 | 10/1997 | (DE) | 297/362 |
| 197 26 257 | 1/1998 | (DE) | 192/15 |
| 196 53 722 | 7/1998 | (DE) . | |
| 197 34 536 | 2/1999 | (DE) . | |
| 0 450 324 | 10/1991 | (EP) . | |
| 0 754 589 A2 | 1/1997 | (EP) . | |
| 05176819 | 7/1993 | (JP) . | |

* cited by examiner

*Primary Examiner*—Sherry Estremsky
(74) *Attorney, Agent, or Firm*—Christie, Parker & Hale, LLP

(57) ABSTRACT

The invention relates to a drive for adjustment devices in motor vehicles, more particularly for vehicle seats, having a stepped switch mechanism acting on both sides for manually producing a rotary movement. The object of the present invention is to provide a simplified and cost-effective device for adjusting the vehicle seat components in two directions. This is achieved by connecting the output side of the stepped switch mechanism to a self-blocking gear.

19 Claims, 5 Drawing Sheets

DRIVE FOR ADJUSTMENT DEVICES IN MOTOR VEHICLES

CROSS-REFERENCE TO RELATED APPLICATION

This application claims priority of German Application No. 198 55 004.9 filed Nov. 20, 1998, the disclosure of which is incorporated fully herein by reference.

FIELD OF THE INVENTION

The invention relates to a drive for adjustment devices in motor vehicles. In particular, the invention serves to facilitate the adjustment of component parts of a vehicle seat or of the entire vehicle seat.

BACKGROUND OF THE INVENTION

DE 196 53 722 A1 discloses a manual drive acting on both sides to produce a rotary movement. The device has a stepped switch mechanism that contains a fixing device that locks torque occurring on the output side. The stepped switch mechanism is arranged between a drive and an output element. The fixing device is formed as a loop spring brake and prevents the undesired displacement of the adjustment device, for example a seat back.

In order to achieve this fixing position a relatively complicated mechanism is required having a number of component parts that have to be fitted together in an expensive assembly process.

SUMMARY OF THE INVENTION

One object of the present invention is to provide a simple, cost-effective drive that can be adapted with low expense to different components of a vehicle adjustment device. The drive is to be particularly suitable for adjusting seat components.

By arranging a self-locking gearbox between a stepped switch mechanism and the device that is to be adjusted it is possible, in a simple and cost-effective manner, to prevent torque applied on the output side from causing undesired displacement of the device that is to be adjusted, such as the seat back or seat cushion of a vehicle seat.

Furthermore, through a suitable transmission ratio of a gearbox, it is possible to adapt to the requirements of the device or components that are to be adjusted. For example, for a seat height adjustment as compared to a seat length adjustment, a substantially smaller step width is used per displacement stroke with a simultaneously higher force expense.

In order to adapt the displacement path per stroke of the stepped switch mechanism to the relevant area of use, a reduction or translation step is arranged between the self-locking gearbox and the stepped switch mechanism. When adjusting the seat length, as a rule, greater displacement paths per stroke are desired than when adjusting the seat height. Consequently, for adjusting the seat length a gear step will be provided with a translation step, while for adjusting the seat height a reduction will be applied. When adjusting the seat height, a reduction does indeed have an advantage, in addition to the finer adjustability, that the relatively high operating forces based on the weight of the seat user are reduced.

In addition to the gear step, or as an alternative thereto, it is possible to mount a transmission member between the self-locking gear and the stepped switch mechanism whereby a spatial uncoupling of the two structural groups becomes possible. The stepped switch mechanism can thus be mounted at a place where it can be easily operated by the user, irrespective of where the displacement is actually to take place. The gear is preferably mounted near the device that is to be displaced but can however equally be connected to the device to be displaced through a transmission member. Transmission members can be for example shafts and traction drives, but are not restricted to these.

The type of self-locking gear is thereby freely selected in principle, however planetary, tumbler, or eccentric gears are preferred wherein an inclined spur wheel, an inclined ball wheel, or cyclo gears, as well as worm or spindle gears, can all be used depending on conditions.

While the gear is driven by a stepped switch mechanism it is connected on the output side to a seat height, seat incline, seat length, seat cushion depth, or head rest adjustment device.

In another embodiment of the present invention, the gear is connected on the output side directly to a seat backrest to produce a direct adjustment.

As an alternative to a direct action on the device to be displaced, the gear may have an output shaft with an output element mounted thereon for moving the device to be adjusted. This output element is preferably formed as a pinion however, other designs such as a worm, spur wheel, or friction clutch element are also possible.

In order to allow the simplest possible interface between the stepped switch mechanism and the gear, the stepped switch mechanism has at its output a drive element, coupled to the gear. The drive element operates as a coupling member between the structural groups of the stepped switch mechanism and gear and can be a common constituent part of both structural groups.

In an embodiment of the present invention, the drive element is formed as a pinion and can in the case of a tumbler or eccentric gear be both the eccentrically rotating gearwheel and the stepping element of the stepped switch mechanism.

In an alternative embodiment of the present invention, the drive element can be formed as only a constituent part of the gear that is driven by the stepped switch mechanism through for example, an eccentric bearing, the formation of a planetary gear part, or the like.

Furthermore, it is possible to arrange at least one gear step between the drive element and the gearbox to produce a suitable input transmission.

If the gear is formed as a tumbler or eccentric gear there is the advantage of providing an output element with an inner gearing in which an eccentrically mounted spur wheel rotates with a smaller number of teeth compared to the inner gearing, the spur wheel being coupled in force locking or positive locking engagement with the drive element.

As an alternative to a force locking or positive locking connection between the spur wheel and drive element, the drive element can be formed as the spur wheel of the tumbler or eccentric gear and mounted eccentric relative to the inner teeth of the output element.

In an additional embodiment of the present invention, an eccentric is formed on the drive element, and a spur wheel is mounted on the eccentric and is driven by the eccentric to engage in a tumbler or eccentric gear.

In an additional embodiment of the present invention, the tumbler or eccentric gear has a housing in which are mounted an eccentric, driven by the drive pinion and connected to a planetary wheel, and also an output hollow wheel connected to an output shaft and engaging with the planetary wheel. The planetary wheel has a drive wheel engaging with the output hollow wheel, and an axially adjoining support wheel that engages with a support hollow wheel fixed on the housing.

In order to ensure a simple force-saving operation of the adjustment device, the stepped switch mechanism has a drive lever that is hand operated and with which the stepped switch mechanism, and thus the drive element, is moved or turned in one direction or another selectively, starting from a neutral position. The drive element is thereby only turned when the drive lever is moved from the neutral position while it is not turned when the drive lever is moved in the direction of the neutral position.

In a preferred embodiment of the drive, the drive lever can swivel about a drive axis and is in active connection with the drive element through at least one rocker element which rocks to and fro between two end positions depending on the drive direction. In each end position of the rocker movement, toothed areas of the rocker element engage teeth of the drive element and thus produce a force locking connection between the drive lever and the drive element. In this way the drive element is turned stepwise about a certain angle.

In order to take up the smallest possible structural space, the drive element is provided with inner teeth in which the rocker element engages during each relevant rocker movement. The rocker element is mounted for example to swivel on a holding plate that in turn is mounted on the drive axis of the stepped switch mechanism. The rocker element and the holding plate can thereby be made of plastics or metal and are preferably connected together prior to assembly through a film hinge or an ideal break point.

BRIEF DESCRIPTION OF THE DRAWINGS

The idea on which the invention is based will now be explained in further detail with reference to the embodiments shown in the drawings in which.

DETAILED DESCRIPTION

Figure 1:
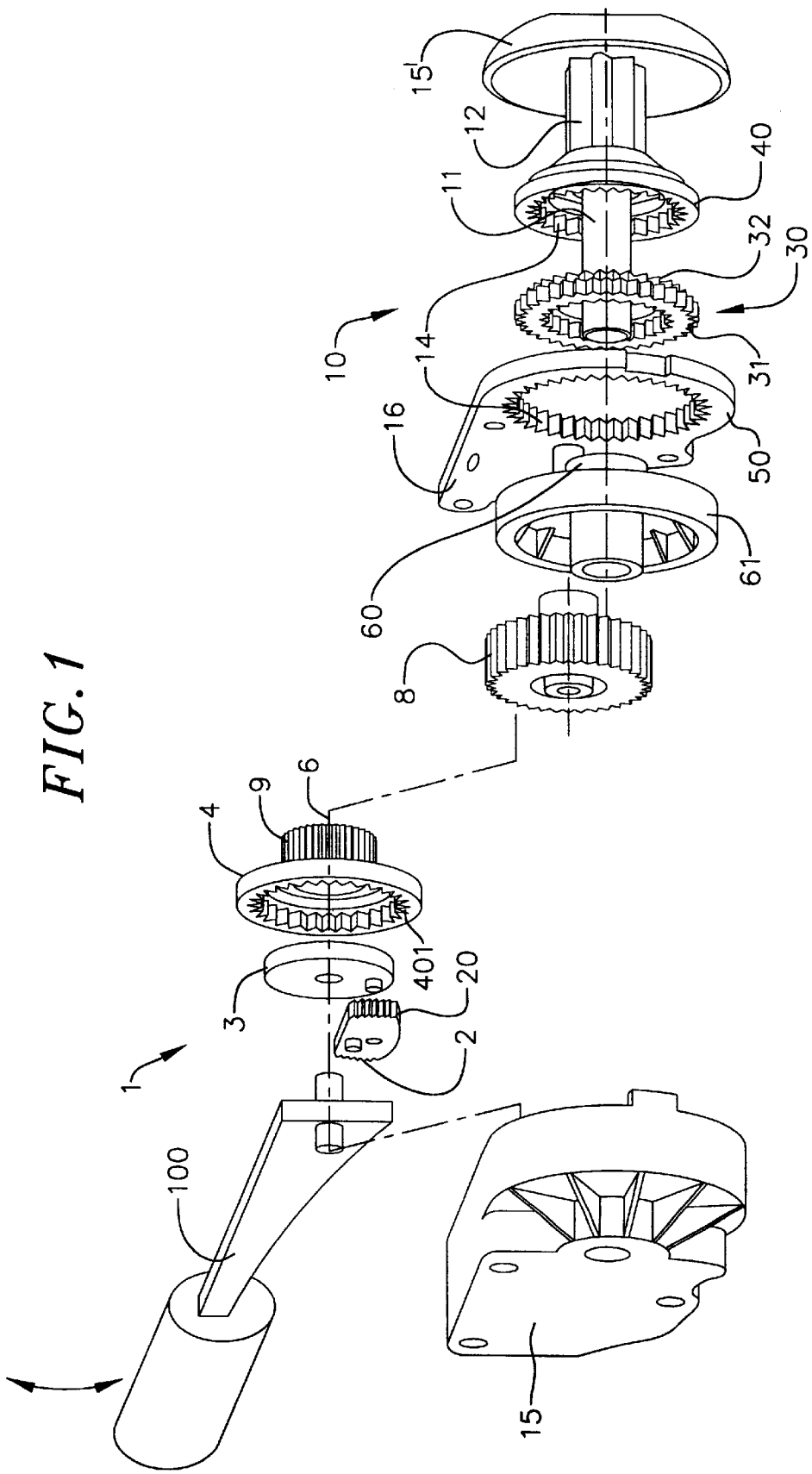
FIG. 1 is an exploded view of a device for adjusting a vehicle seat.

FIG. 1 shows an exploded view of a device for adjusting a vehicle seat having a drive for the adjustment device formed as a stepped switch mechanism 1, and a self-locking gear 10 that transfers a torque on the drive side for the adjustment device or vehicle seat components, but blocks a torque on the output side. The stepped switch mechanism 1 consists of a drive lever 100 that can swivel a restricted amount about a drive axle 6 in the direction of the double arrow. Furthermore, a holding plate 3 with a rocker element 2 mounted thereon outside of the drive axle 6, as well as a drive element 4 are mounted on the drive axle 6. From the point of view of the stepped switch mechanism 1 the drive element 4 provides the output, but the drive element acts as the drive for the gear 10 so that here the term drive element has been selected.

As a result of its bearing outside of the drive axle 6, when the drive lever 100 is swivelled out of a rest position, the rocker element 2 is brought into engagement by its detent elements 20 with the corresponding detent elements 401 of the drive element 4. In the selected embodiment the detent elements are formed as teeth. Through the engagement of the detent elements 20, 401 a torque produced through the drive lever 100 is transferred to the drive element 4 and converted into a rotation of the drive element 4.

A pinion 9 is formed or fixed on the drive element 4 and transfers the rotation through a gear step 8 to the self-locking gear 10. The gear 10 is formed as a tumbler or eccentric gear and has an eccentric wheel 61 on which an eccentric 60 is formed. The rotation transferred to the eccentric 60 creates, through the bearing point of the eccentric 60, a tumbling movement of the planetary wheel 30 which is mounted on the eccentric 60. With this tumbling movement the drive wheel 32 of the planetary wheel 30 rolls on the inner teeth 14 of the output hollow wheel 40.

Because the support wheel 31 of the planetary wheel 30 is supported on the inner teeth 14 of the hollow support wheel 50 the tumbling movement of the planetary wheel 30 leads to a rotation of the hollow output wheel 40 that is reduced in speed.

As a result of the connection of the hollow output wheel 40 with the output shaft 11 the rotary movement is transferred to the output element 12 which is here formed as a pinion. Displacement of, for example, a backrest incline, seat incline, or seat height can be carried out with this output pinion 12.

The entire arrangement of stepped switch mechanism 1 and gear 10 is thereby mounted in a housing 15 having a gear cover 16 and a lower housing part 15'.

Figure 2:
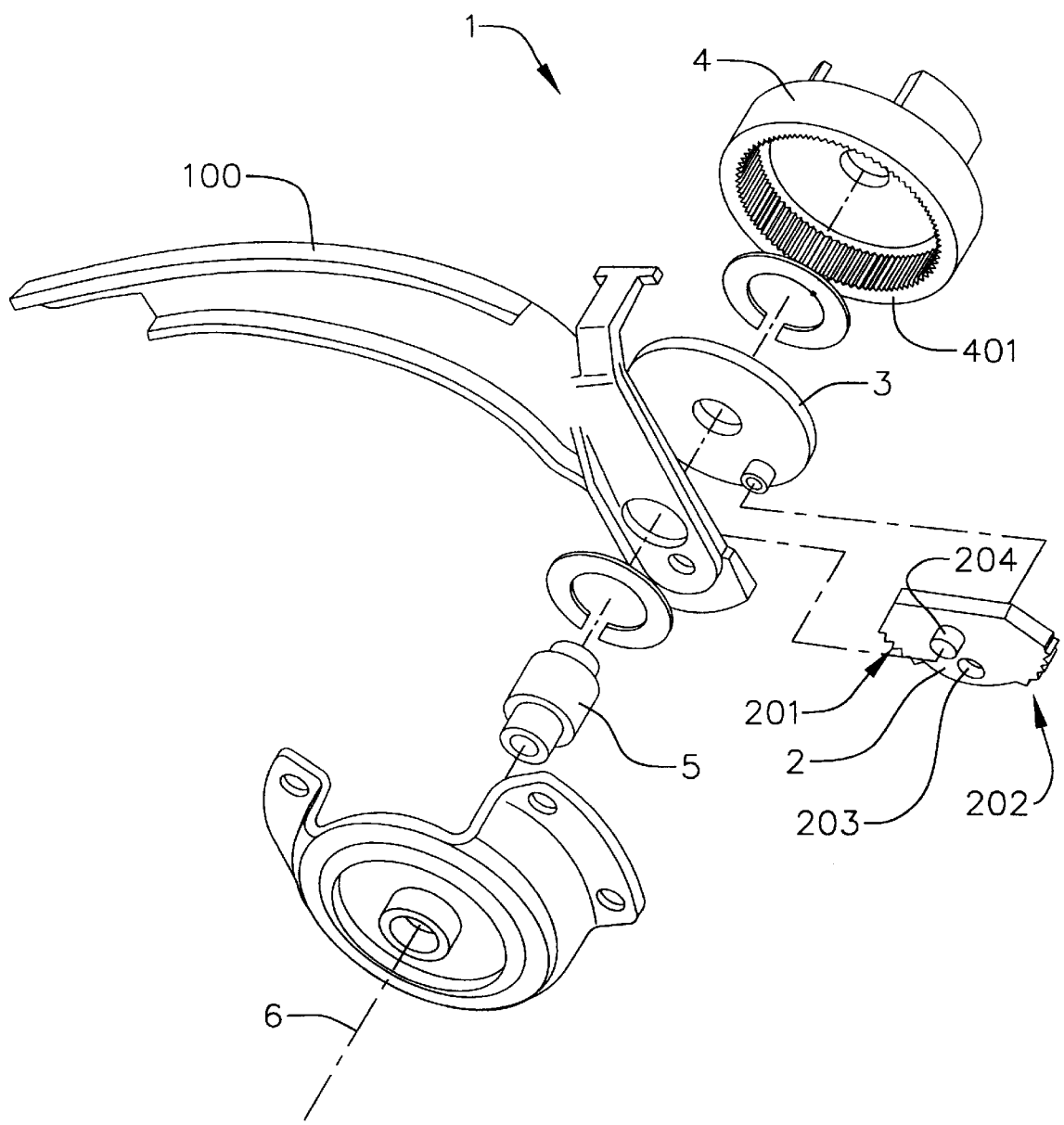
FIG. 2 is an exploded view of a stepped switch mechanism adjustable through a lever.

In FIG. 2 a stepped switch mechanism 1 serving as a drive for a seat adjustment device is shown isolated in an exploded view illustrating the functioning principle of the stepped switch mechanism 1. The drive lever 100, the rocker element 2, the holding plate 3 as well as the drive element 4 with inner teeth 401 are mounted on a distance sleeve 5 which is mounted along a drive axle 6.

The rocker element 2 has two symmetrically arranged toothed areas 201, 202 lying on a circular circumference wherein one of the toothed areas 201, 202 can be brought into engagement with the detent elements 401 of the drive element 4 depending on the drive direction. Two bearing points radially spaced relative to the drive axle 6 are arranged on the axis of symmetry of the rocker elements 2 and through these bearing points the rocker element 2 is connected on the one hand to the drive lever 100 and on the other to the holding plate 3. The bearing point between the rocker 2 and drive lever 100 is thereby formed by a pin or pivot 204 that engages in a corresponding recess in the drive lever 100. The bearing point between the holding plate 3 and rocker element 2 is formed in a corresponding way by a pin or stud of the holding plate 3 which engages in a hole 203 of the rocker element 2.

During swivel movement of the drive lever 100 from the neutral position the pin 204 of the rocker element 2 mounted in the hole of the drive lever 100 is likewise swivelled about the drive axle 6. As a result of friction forces between the holding plate 3 and the distance sleeve 5 as well as where applicable the drive element 4 or by using a torsional spring the holding plate 3 first opposes co-rotation with the drive lever 100. The pin of the holding plate 3 thereby forms a counter bearing so that a torque engages on the rocker element 2 whereby the rocker element 2 tilts and depending on the drive direction one of the toothed areas 201, 202 of the rocker 2 engages in the detent elements 401 of the drive element 4.

When the drive lever 100 swivels upwards out of the neutral position the rocker element 2 is tilted for example, to the left so that the toothed area 201 comes into engagement with the teeth 401 of the drive element 4. In this way a rotary movement of the drive lever 100 is transferred to the drive element 4.

When the drive lever 100 swivels back into the neutral position the torque applied to the rocker element 2 is lifted and the toothed areas 201, 202 come out of engagement. When the drive lever 100 returns it does not result in a resetting movement of the drive element 4.

When the drive lever 100 is operated in the opposite direction a stepped rotation of the drive element 4 is effected accordingly.

Figure 3:
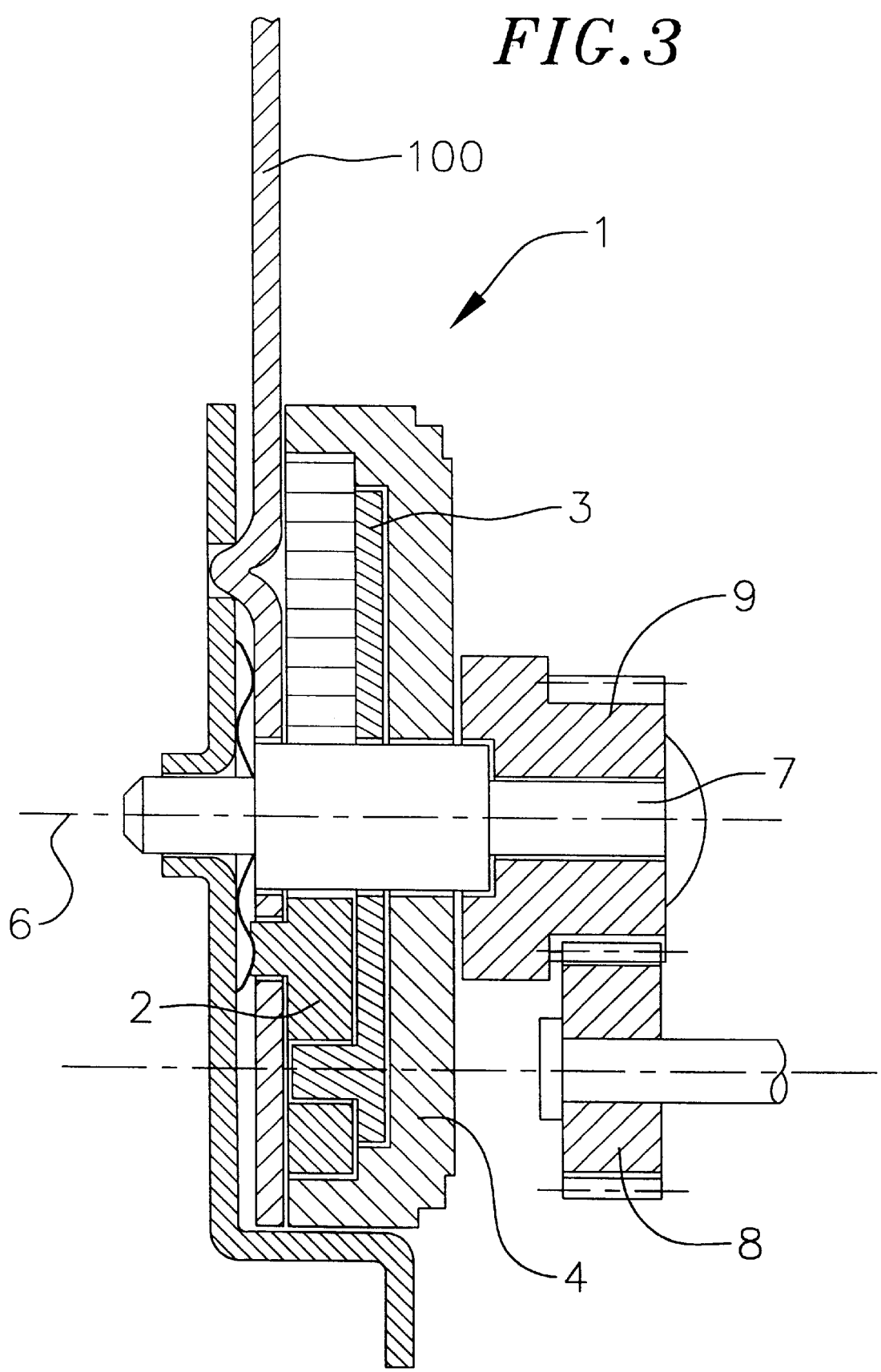
FIG. 3 is a section through a stepped switch mechanism with an intermediate gear.

FIG. 3 shows a section through a stepped switch mechanism 1 having a drive lever 100 that can swivel about the drive axle 6 and a holding plate 3 on which a rocker element 2 is mounted. The rocker element 2 is likewise connected to the drive lever 100 and during rotation engages into the drive element 4 which is connected in force locking and positive locking engagement with the shaft 7 thereby transferring the rotary movement to the shaft. A pinion 9 is fixed on the shaft 7 for example by press-fitting or multi-toothed connection and is secured axially by means of a deformation element or a rivet connection. The pinion 9 meshes with a gear step 8 which transfers the rotary movement or torque to the self-locking gear 10 (not shown).

Figure 4:
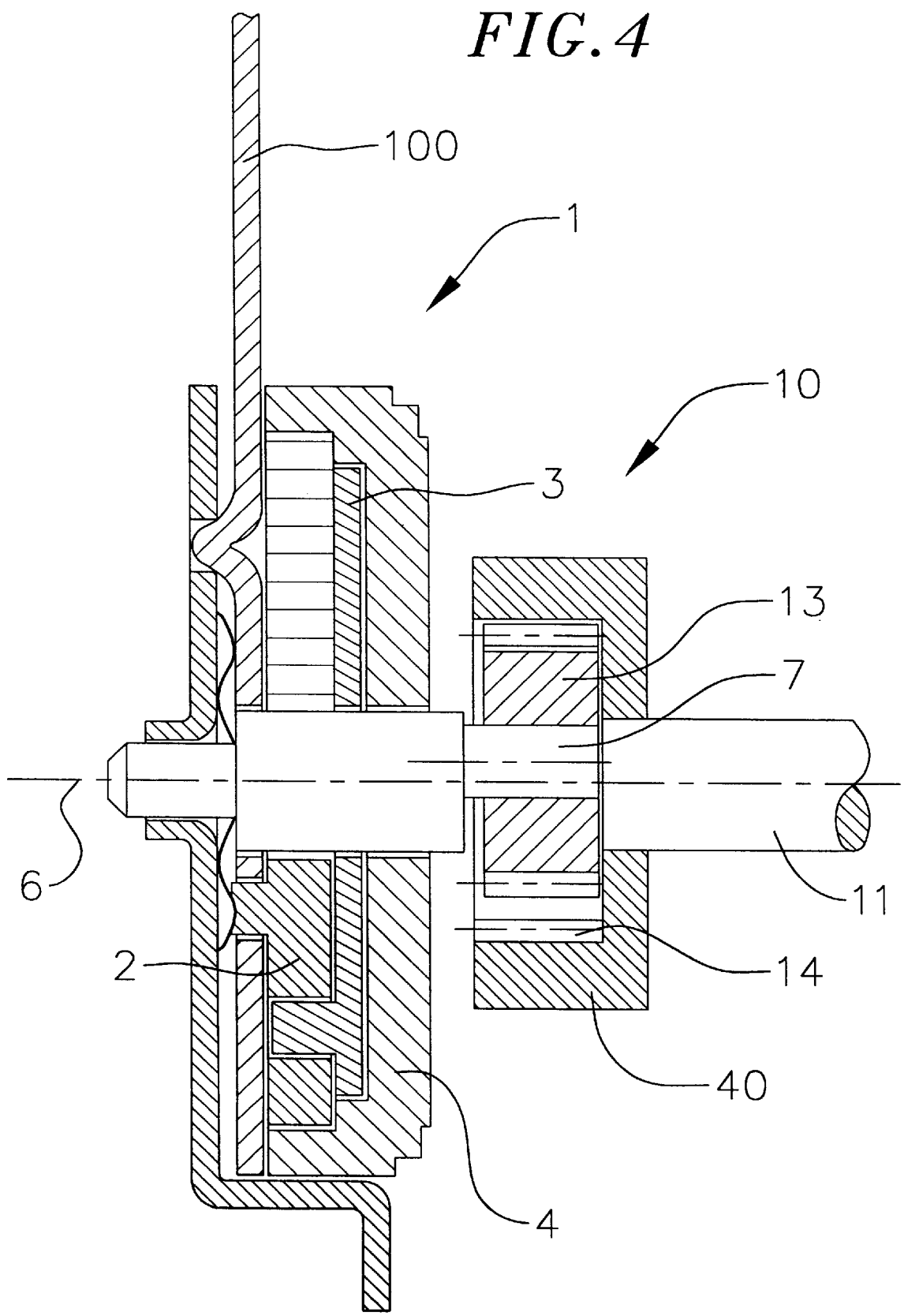
FIG. 4 is a section through a stepped switch mechanism with a coupled eccentric gear.

FIG. 4 shows an additional type of coupling between a stepped switch mechanism 1 and a gear 10. The construction of the stepped switch mechanism 1 is identical with that described in FIG. 3. The shaft 7 is however mounted eccentric relative to the drive axle 6 and supports a spur wheel 13 that engages in inner teeth 14 of a hollow output wheel 40. The hollow output wheel 40 in turn rotates the output shaft 11 which is connected to the seat components that are to be displaced but are not shown, as displacement device.

Figure 5:
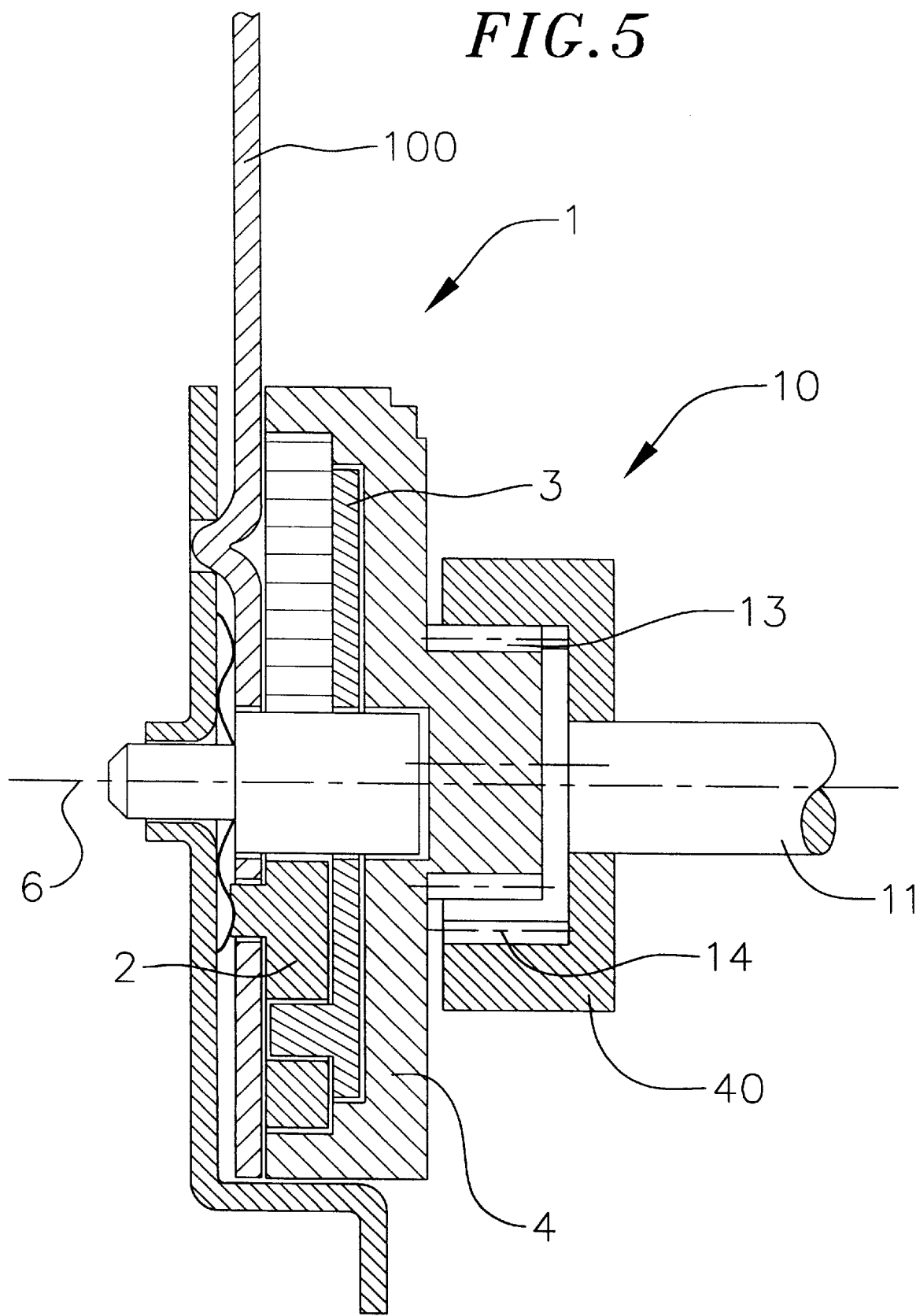
FIG. 5 is a section through a stepped switch mechanism with a pinion formed thereon.

FIG. 5 shows an embodiment of a coupling between a stepped switch mechanism 1 and an eccentric gear 10 wherein a spur wheel 13 that is mounted eccentric relative to the drive axis 6 is formed directly on the drive element 4 and meshes with inner teeth 14 thereby forming together with the hollow output wheel 40 an eccentric gear 10.

What is claimed is:

1. A drive for an adjustment device comprising:
   a stepped switch mechanism having a first side, a second side and an output side and acting on both the first side and the second side to manually produce and transfer a rotary movement, the stepped switch mechanism having a swivel mounted drive lever that produces the rotary movement from a neutral position into at least one rotary direction about a rotary axis, a drive element and at least one coupling element mounted on the drive lever to transfer torque to the drive element; and
   a self-locking gear coupled to the drive element to block torque introduced on the output side of the stepped switch mechanism.

2. The drive according to claim 1 further comprising a reduction or transmission step arranged between the self-locking gear and the stepped switch mechanism.

3. The drive according to claim 2 further comprising a tumbler or an eccentric gear wherein the tumbler or eccentric gear has a housing in which are mounted an eccentric driven by a drive pinion and connected to a planetary wheel, a hollow output wheel, which is connected to an output shaft and engages with the planetary wheel; and wherein the planetary wheel has a drive wheel which engages with the hollow output wheel, and an axially adjoining support wheel which engages with a hollow support wheel which is fixed relative to the housing.

4. The drive according to claim 1 further comprising a transmission member mounted between the self-locking gear and the stepped switch mechanism.

5. The drive according to claim 1 wherein the self-locking gear includes at least one of a planetary, tumbler, and eccentric gear.

6. The drive according to claim 1 wherein the self-locking gear is connected on the output side to an adjustment device formed as at least one of a seat height, seat incline, seat length, seat cushion depth, and head rest adjustment device.

7. The drive according to claim 1 wherein the self-locking gear is connected on the output side directly to an adjustment device formed as a seat backrest.

8. The drive according to claim 1 wherein the self-locking gear has an output shaft with an output element mounted thereon for moving the adjustment device.

9. The drive according to claim 8 wherein the output element is formed as a pinion.

10. The drive according to claim 1 wherein the stepped switch mechanism is coupled by a drive element to the gear.

11. The drive according to claim 10 wherein the drive element is formed as a pinion.

12. The drive according to claim 10 or 11 wherein at least one gear step is arranged between the drive element and the self-locking gear.

13. The drive according to claim 1 wherein the drive lever, with which selectively starting from a neutral position the drive element is turned in at least one direction; and wherein the drive element is rotated when the drive lever is moved away from the neutral position while it is not rotated when the drive lever is moved in the direction of the neutral position.

14. The drive according to claim 13 wherein the coupling element comprises at least one rocker element, the rocker element being in active connection with the drive element; wherein the drive lever is swivelable about a drive axle; and wherein the drive lever tilts the at least one rocker element between two end positions depending on the drive direction; and wherein in each end position toothed areas of the rocker element engage in teeth of the drive element.

15. The drive according to claim 14 wherein the rocker element engages in inner teeth of the drive element.

16. The drive according to claim 14 or 15 wherein the rocker element is mounted for swivel movement on a holding plate mounted on the drive axle.

17. The drive according to claim 16 wherein the rocker element and holding plate are made from at least one of plastics and metal.

18. The drive according to claim 16 wherein the rocker element and holding plate are connected together prior to assembly through a film hinge or ideal break point.

19. A drive for an adjustment device comprising:
   a stepped switch mechanism having a first side, a second side, and an output side and acting on both the first side and the second side to manually produce and transfer a rotary movement, the stepped switch mechanism having a swivel mounted drive lever that produces the rotary movement from a neutral position into at least one rotary direction about a rotary axis, a drive element and at least one coupling element mounted on the drive lever to transfer torque to the drive element; and a self-locking gear coupled to the drive element to block torque introduced on the output side of the stepped switch mechanism;

wherein the self-locking gear blocks torque on the output side of the stepped switch mechanism without an additional locking mechanism.

* * * * *